Dec. 27, 1949  G. A. KOHOUT  2,492,585
STOKER
Filed May 19, 1945  8 Sheets-Sheet 1
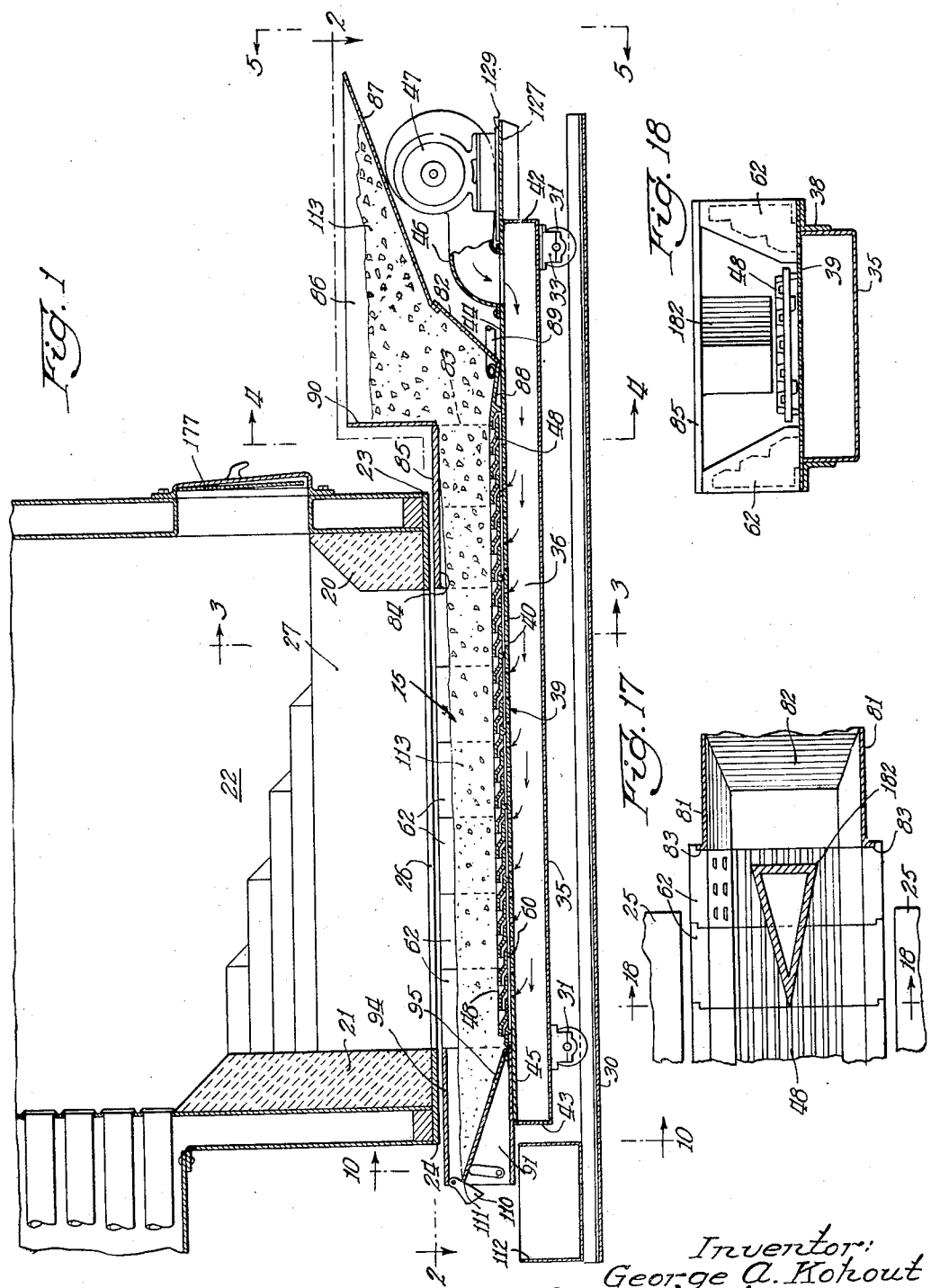
Inventor:
George A. Kohout
By: Zabel and Gritzbaugh
Attys.

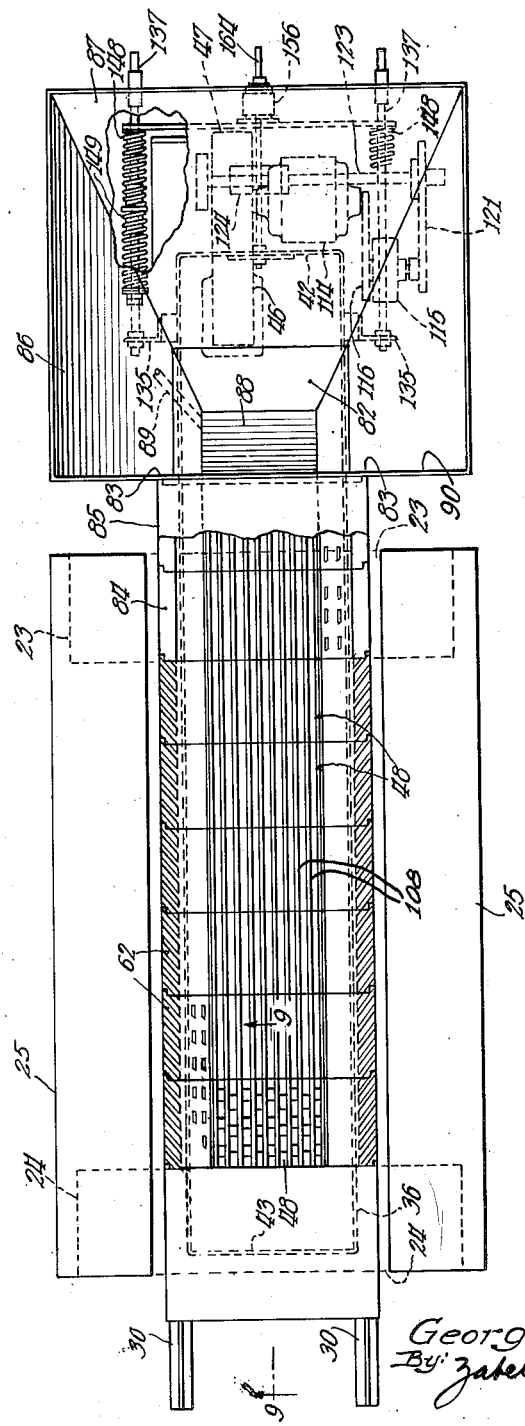

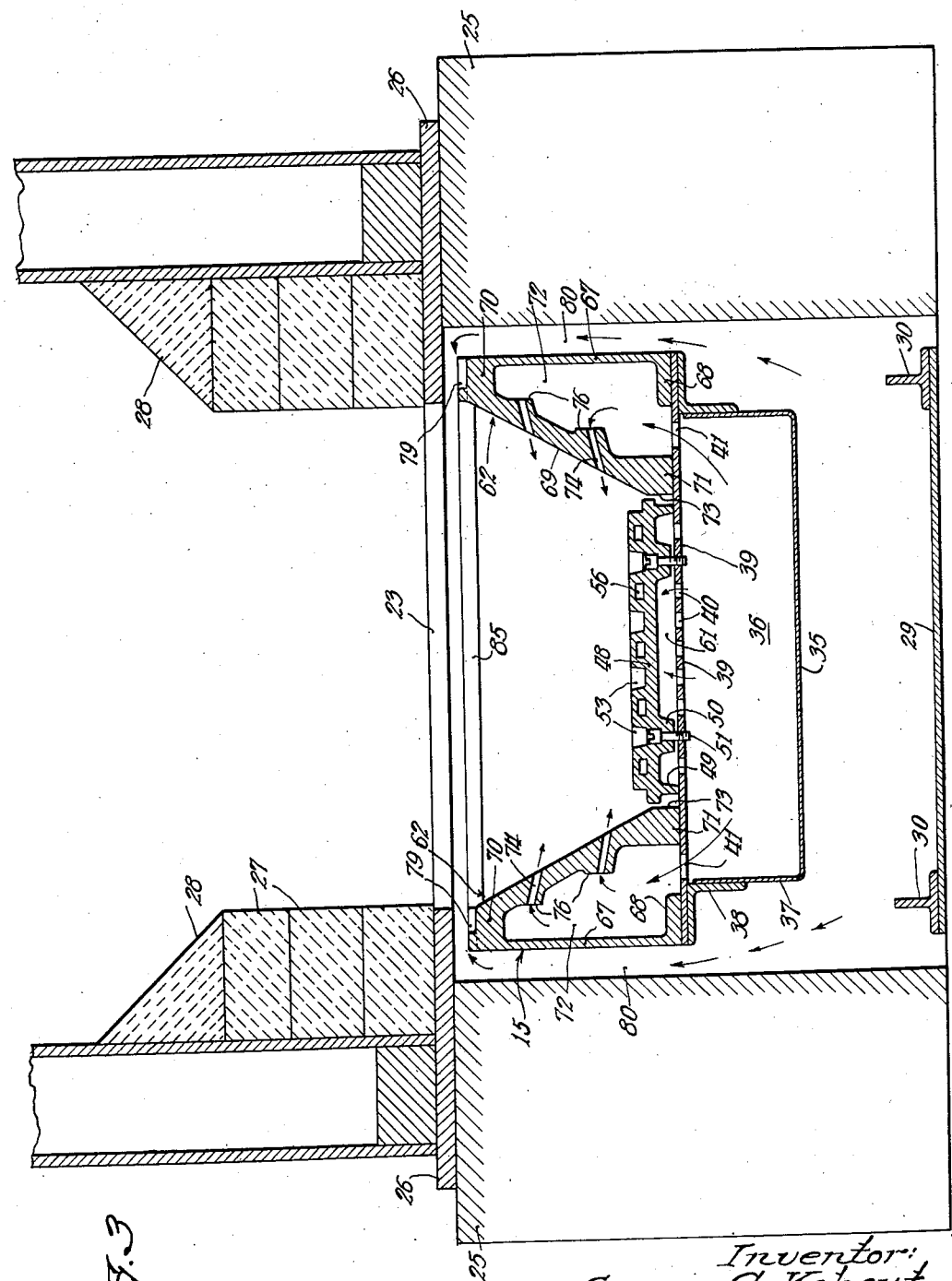

Dec. 27, 1949  G. A. KOHOUT  2,492,585
STOKER
Filed May 19, 1945  8 Sheets-Sheet 4
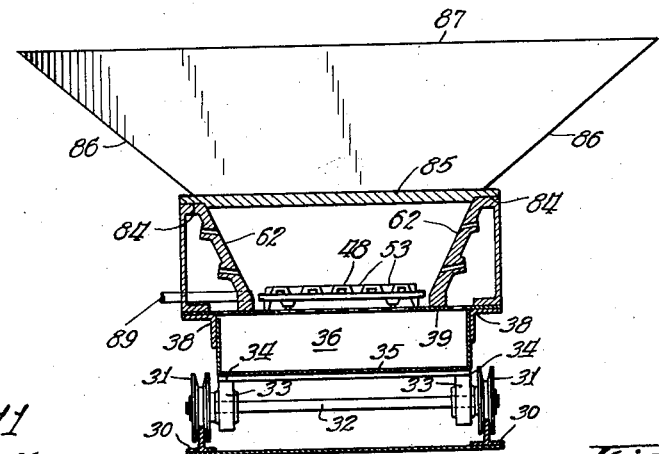
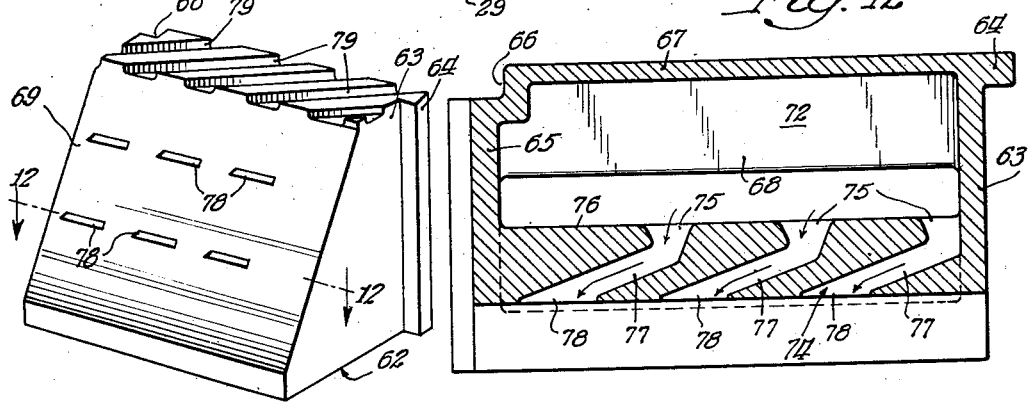
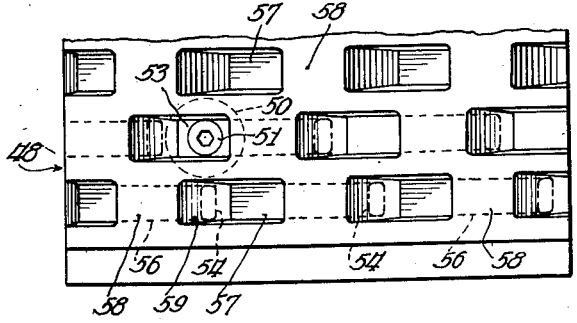
Inventor
George A. Kohout
By: Zabel and Gritzbaugh
Attys.

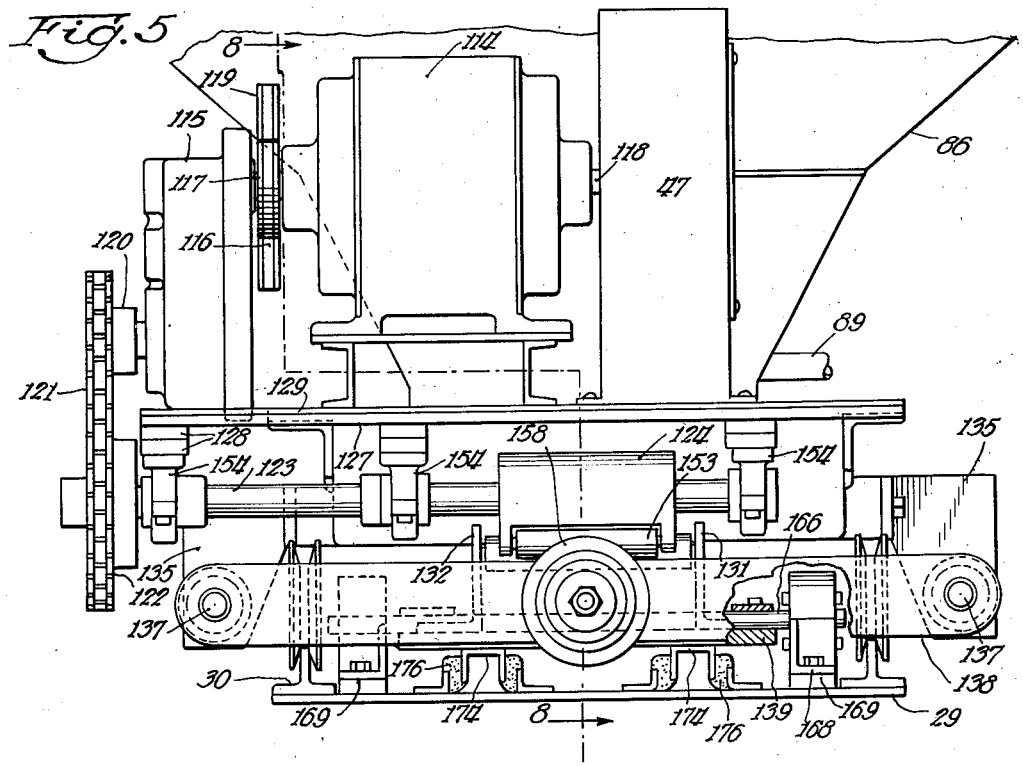
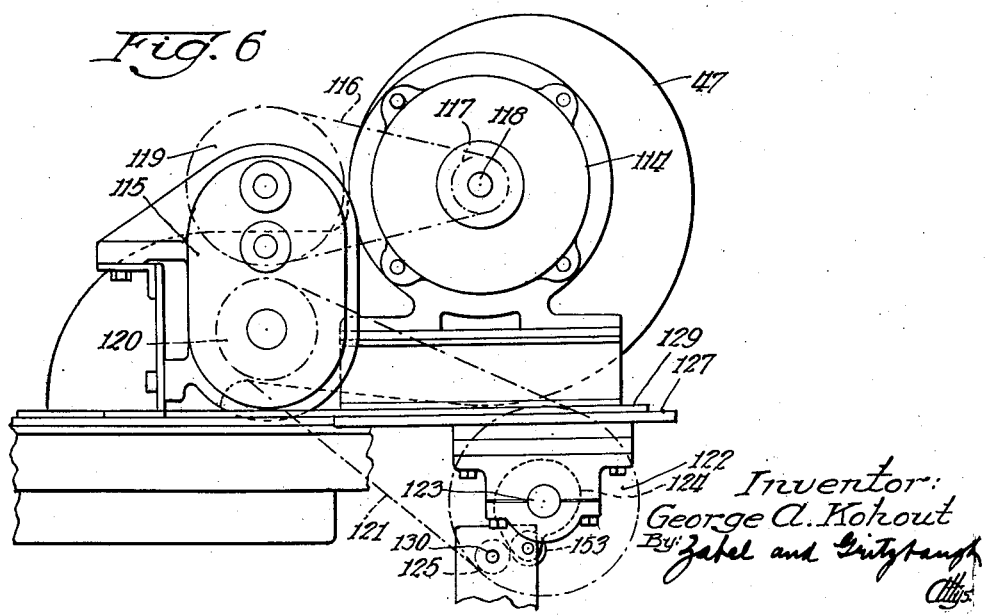

Dec. 27, 1949 G. A. KOHOUT 2,492,585
STOKER
Filed May 19, 1945 8 Sheets-Sheet 7

Inventor
George A. Kohout
By: Zabel and Fitzpaugh
Attys.

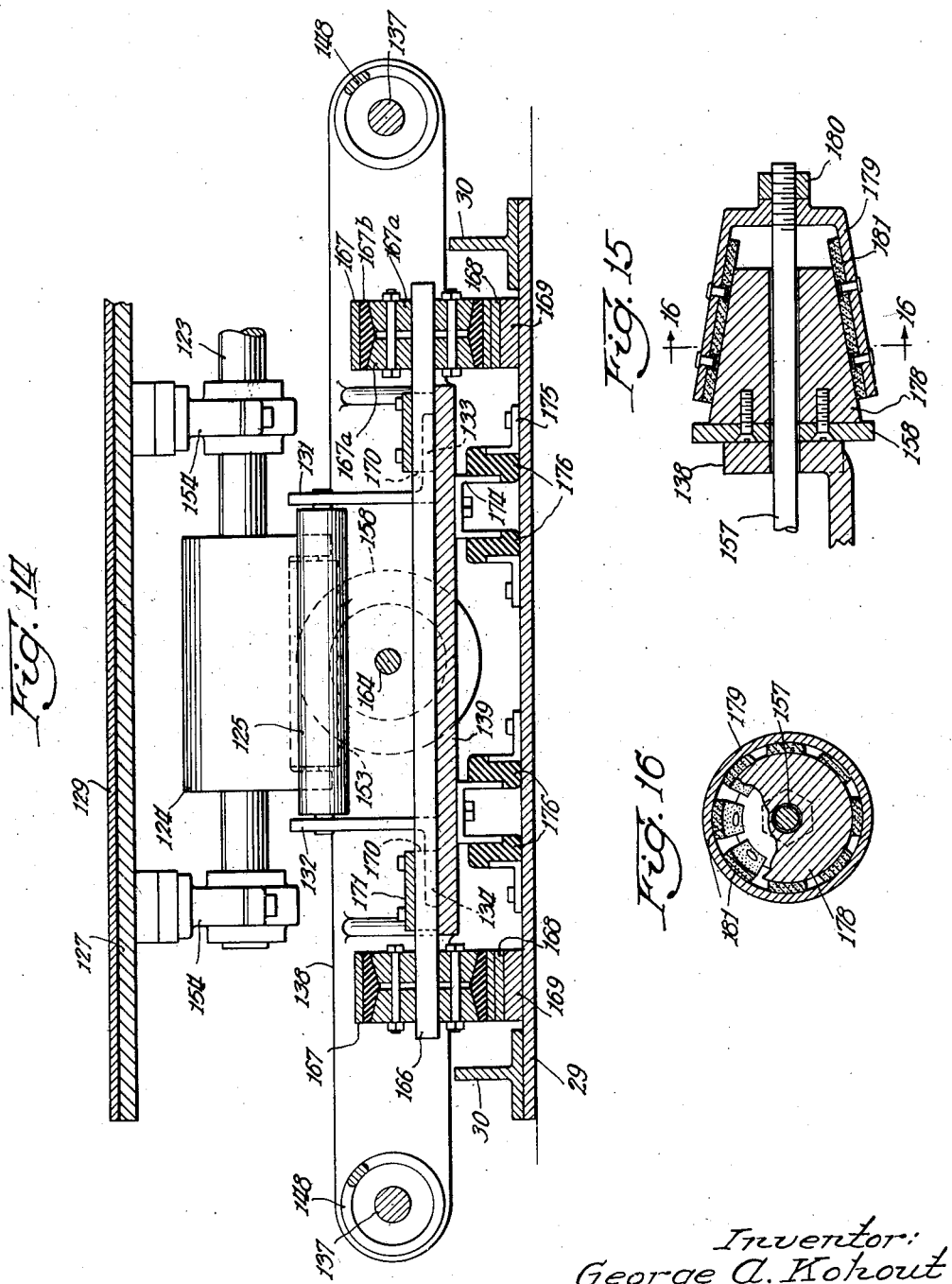

Patented Dec. 27, 1949

2,492,585

UNITED STATES PATENT OFFICE 2,492,585

STOKER

George A. Kohout, Chicago, Ill.

Application May 19, 1945, Serial No. 594,711

19 Claims. (Cl. 110—38)

1

My invention relates to stokers and has for its object the provision of a novel combination of a fuel trough and means utilizing inertia of the fuel and gas jet propulsion to advance fuel in the trough from one end to the other end thereof.

My invention contemplates the provision of a combined conveyor and grate with a power drive that effects advance of the fuel by giving the conveyor such a reciprocating action that inertia of the loose body of particles of solid fuel, such as coal or coke, causes it to move in one direction and jets of gas, such as air are directed against the fuel particles so that they lift the fuel and help it along in the desired direction of advance. These jets also supply air for combustion of the fuel.

In a preferred form of my invention, I provide a fuel inlet section at the front of the conveyor which is made to project from the furnace in position to carry a hopper to which fuel is supplied. The conveyor is so constructed and mounted that its reciprocating motion can take place freely without the necessity of building movable parts or special mechanism into the furnace.

It is also a purpose of my invention to provide a novel means for separating water from wet fuel in a stoker of the type described.

It is a further purpose of my invention to provide means at the discharge end of the stoker for controlling the thickness of the bed of fuel on the grate, such means comprising an adjustable gate member that constitutes an inclined floor at the discharge end of the stoker, the angle of inclination of which is adjustable to vary the height of the discharge edge thereof whereby the level of the discharge is controlled and the thickness of the bed of fuel is determined.

It is a further purpose of my invention to provide a movable grate member with means for supplying air to the fuel bed therethrough, said grate member being moved in such manner as to advance the fuel longitudinally from the hopper end of the grate to the ash discharging end thereof, said air being supplied in such a manner that streams thereof at high velocity are directed upwardly at an oblique angle and toward the discharge end of the grate, whereby said streams of air cooperate with the means for moving the grate to accelerate the movement of the fuel longitudinally of the stoker toward the discharge end thereof.

It is a further purpose of my invention to provide in a stoker of the above mentioned charac-

2 ter, means for supplying air to the fuel bed which is directly connected with the shaft of the motor, that drives the means for moving the grate bodily back and forth through flexible driving members such as belts and pulleys, so that in case a failure in the driving mechanism for the means for moving the grate back and forth should develop, air will continue to be applied to the fuel bed so as to prevent injury to the grate due to overheating the same if such air were not supplied.

Other objects and advantages of my invention will appear as the description of the drawings proceeds. I desire to have it understood, however, that I do not intend to limit myself to the particular details shown and described except as defined in the claims.

In the drawings:

Figure 1 is a fragmentary vertical sectional view of the furnace showing my improved stoker in operative relation thereto, said stoker being partly in longitudinal section and partly in elevation, portions thereof at the hopper end of said stoker being broken away;

Figure 2 is a section taken on the line 2—2 of Figure 1 but showing the operating mechanism broken away in Figure 1;

Figure 3 is a transverse sectional view on a larger scale than in Figures 1 and 2, said section being taken substantially on the line 3—3 of Figure 1;

Figure 4 is a section taken on the line 4—4 of Figure 1;

Figure 5 is an end view of the operating mechanism for the stoker on a larger scale than Figure 1, taken substantially from the line 5—5 of Figure 1;

Figure 6 is a fragmentary side elevational view of said operating means;

Figure 11 is an enlarged perspective view of one of the side members of the troughlike fuel supporting member;

Figure 12 is a horizontal section through the side member shown in Figure 11 taken substantially on the line 12—12 of Figure 11;

Figure 13 is a fragmentary top plan view of the grate on a larger scale than Figure 2;

Figure 14 is a fragmentary sectional view taken on the line 14—14 of Figure 8 and somewhat enlarged;

Figure 15 is a sectional view through a modified form of bumper member;

Figure 16 is a sectional view on the line 16—16 of Figure 15;

Figure 17 is a fragmentary sectional view illustrating a modified form of inlet for the fuel conveyor; and Figure 18 is a sectional view on the line 18—18 of Figure 17.

Figure 7:
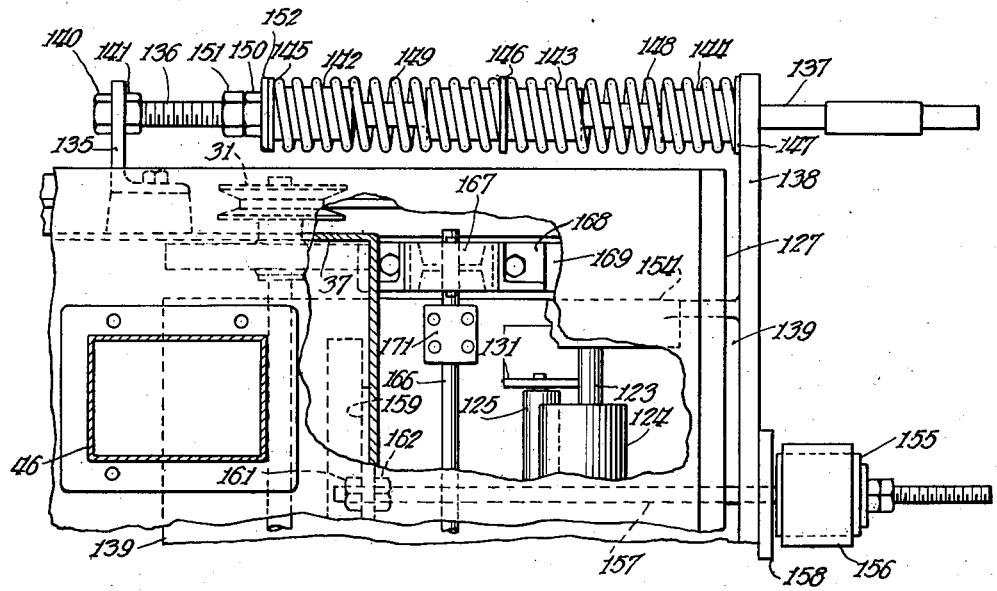
Figure 7 is a fragmentary plan view partly broken away showing a portion of the operating means for reciprocating the troughlike member embodying the grate therein.

Referring in detail to the drawings, my improved stoker is shown as being applied to a furnace having a front wall 20 and a wall 21 opposite thereto, said walls along with the side walls defining a fire box 22. The walls 20 and 21 are supported on ledge plates 23 and 24 respectively, said ledge plates forming the top walls of openings through which the inertia, jet propulsion stoker extends as will be described below. The ledge plates extend between suitable foundation members such as the concrete foundations 25 and are supported thereby, similar plates 26 also being mounted on said concrete foundation 25 and supporting the side walls including refractory members 27 and 28.

Mounted on a suitable support 29 are rails 30 which are substantially inverted T-shaped in cross section and with which the grooved wheels 31 cooperate. The wheels 31 are mounted on axles 32, which are mounted in depending bearing brackets 33, mounted on longitudinally extending re-enforcing bars 34 fixed to the bottom wall 35 of an air supply chamber 36.

Said air supply chamber 36 has upstanding side walls 37 which are secured by means of longitudinally extending angle members 38 to the bottom plate 39 of the troughlike member 15 thus formed which has the grate mounted thereon. Said bottom plate is provided with a plurality of openings 40 therein in the area in which the grate is located, and openings 41 at the sides of the area in which the grate is located, said openings 40 and 41 being provided throughout the length of the grate. The parts 37, 38 and 39 are secured together rigidly in fixed position by welding or in any other suitable manner. The air chamber 36 is also provided with end walls 42 and 43 and with imperforate top walls 44 and 45 extending from said end walls to the perforated portion underneath the grate as will be obvious from Figures 1, 8 and 9. A boxlike chamber is thus provided for supplying air to the grate which is perforated only in the area thereof covered by the grate and at both sides of the grate. An air supply duct 46 leads through the top wall 44 into the chamber 36 from a blower 47.

A plurality of transversely extending grate members 48 is provided to make up the grate portion of the movable troughlike member 15 that receives the fuel and conveys it from the fuel receiving end through to the discharge end thereof. Each of said grate members is provided with depending ribs 49 which rest on the bottom plate 39 and with a plurality of depending bosses 50 through which the headed screwthreaded securing elements 51 extend, said securing elements being screw-threadedly connected with the plate 39 and having the heads thereof countersunk in openings 53 in said grate member 48. A plurality of passages for air are provided in each of said grate members. These passages have short vertical inlet portions 54 leading to obliquely extending portions 55 which are inclined upwardly and toward the rear or discharge end of the grate and which lead into horizontally extending portions 56 which are substantially parallel to the top face portions 57 and 58 of said grate members. These passages direct jets of air into the bottom of the fuel bed on the grates. The parallel faces 58 and 57 of the grate surface are vertically spaced from each other, being connected by means of inclined offset portions 59 which act as deflecting surfaces for air jets from the passages 56, deflecting the same obliquely upwardly and rearwardly toward the discharge end of the furnace. The air jets exert a lifting and propelling force on the fuel particles. Due to the provision of the depending ribs 49 and similar transversely extending depending ribs 60 on said grate member 48, an air chamber 61 is provided under each of said grate members 48 and between the same and the platelike member 39 to which the openings 40 supply air from the chamber 36.

The grate portions which have the passages therein have the portions 58 and 59 thereof projecting upwardly above the portions 57 to thus provide hollow projections alternating with the depressed portions arranged in rows lengthwise of the stoker. Between said rows of alternating raised portions and projections are continuous ribs 108, the entire grate thereby having a ribbed effect with air nozzles provided therein lying between the ribs in said grate members 48.

Also mounted on the plate 39 are the side members 62 which are hollow blocklike members shown more clearly in Figures 3, 11 and 12, said hollow blocklike members having end walls 63 provided with ribs 64 and opposite end walls 65 that are provided with rabbets 66 with which the ribs 64 cooperate to hold said blocklike members in alignment. The blocklike members on opposite sides of the troughlike member are of a reverse construction. Each of the members has a vertically extending side wall 67 provided with an inwardly directed bottom flange 68 which is secured to the platelike member 39 in any suitable manner, and an inclined inner wall 69 which is connected with the vertical wall 68 by an upper transverse portion 70. The blocklike members shown in Figures 11 and 12 are those that are shown at the left hand side of Figure 3.

The base portion 71 of each of the inclined walls 69 is spaced from the edge of the flange 68 to provide a longitudinally extending slotlike opening in the bottom of each of said blocks 62 aligning with the openings 41 so that air will flow from the chamber 36 into the chambers 72 provided in the interior of each of the blocklike members 62. At said base portion 71 the inner walls of said blocklike members are provided with short vertically extending portions 73 to fit up to the side edges of the grate members 48. The walls 69 are provided with generally slightly downwardly inclined passages 74 therein, each of which has a tapering inlet opening 75 into the same, the gradually narrowing passage thus formed extending from one of the substantially vertically extending faces 76 of the inner face of the wall 69. An obliquely directed portion 77 extends from the inlet portion 75 of such passage, the walls of said passage gradually diverging toward a relatively wide outlet end 78. The outlets are of a slotlike character as will be evident from Figure 11. A Venturi effect is thus obtained which will increase the velocity of the flow of the air out of the outlet 78. The direction in which the passages 77 extend will cause the air to move through the passage 78 and into the troughlike member 15 at an oblique angle downwardly and toward the rear or discharge end of the grate. The passages of the blocks on the opposite side of the troughlike member 15 are also inclined in the same manner to direct air obliquely downwardly and rearwardly.

The top face of the top connecting wall 70 of each of said side members 62 is provided with obliquely extending grooves 79, and said walls being located closely adjacent the platelike members 26, said grooves provide with the platelike members, means for directing the air, which rises at the sides of the stoker through the passages 80, into the space over the stoker and toward the rear end of the stoker at an oblique angle.

The grates 48 and side wall members 62 are provided in the portion of the stoker in which the burning fuel is located. They extend through the furnace wall at the front end. At the forward end of the troughlike member 15 and forming an integral part thereof, is the bottom portion of the hopper, having the side walls 81 and an inclined end wall 82. Said side walls 81 fit against the ends 83 of the end members 62 of the troughlike member. The front two end members 62 on both sides are cut down as shown at 84 to receive a top wall 85. The top wall extends under the ledge plate 23. The top wall 85 and the side wall members 62 extend to the outlet of the hopper.

Flaring side walls 86 and an end wall 87 are provided on the hopper and form continuations of the hopper walls 81 and 82. An inclined platelike member 88 is provided between the inclined wall 82 of the hopper and the first grate member 48. The bottom wall of the hopper thus formed by the member 88 inclines downwardly toward the wall 82 and a drain pipe 89 is provided at the lower end of the wall 88, so as to drain any water that may be in the fuel that is put into the hopper. The vertical front wall 90 of the hopper fits snugly against the top wall 85, thus closing the space between the hopper and the forward wall of the furnace. Fuel is supplied either manually or from a suitable source of gravity supply to the hopper as may be required in accordance with the rate of feed of the stoker.

At the discharge end of the troughlike member 15 an extension of said troughlike member is provided which has vertical side walls 91 provided with bottom longitudinally extending flanges 92 and top longitudinally extending flanges 93. The flanges 93 have a top wall 94 secured thereto which is closely adjacent the ledge plate 24 and extends under the same to the last of the side wall members 62. The flanges 92 are secured to the top wall 45 of the air chamber 36, and a bottom plate 95 is provided between the side walls 91 extending from the rearmost grate member 48, which is provided with a transversely extending rib portion 96, against which said plate 95 abuts to provide a tight joint therebetween.

Mounted in the extension just described is an inclined plate member 97, which is provided with depending ears 98 for pivotally mounting said plate 97 adjacent the rear end of the grate on a pivot 99. The member 97 is swingable to various angular positions about the axis of the pivot 99, and has an extension 100 beyond said pivot that slightly overlaps the end of the rearmost grate member 48.

A shaft 101 is mounted for rotation in the side walls 91 and has keyed thereto a finger 102 which has a rounded end 103 engaging the under side of the inclined bottom wall member 97. The finger 102 is adjustable by rotation of the shaft 101, to any desired position to obtain any desired inclination of the member 97 between a lower and an upper limit. The means for rotating said shaft to any desired position and holding the same in such adjusted position comprises a lever 104 which is keyed to one projecting end of the shaft 102 and which has a clamping screw 105 extending therethrough. The clamping screw extends through a slot 106 in a sector 107 secured to the outer face of one of the walls 91.

Pivotally mounted on a pivot member 109 extending between the side walls 91 is a sealing member 110 which is generally triangularly shaped in cross section and is made of such weight that it will tend to engage with the top edge 111 of the member 97 and prevent air flow through the opening between the top edge 111 of the member 97 and the top wall 94 of the ash discharge section of the stoker. The member 110 is light enough that it will be pushed from the top edge 111 of the member 97 when ashes are passing over said top edge, but the member 110 will engage with ashes passing over the top edge 111 of said member to maintain the air seal. The ashes may be discharged into any suitable receptacle, such a receptacle being indicated conventionally at 112 in the drawings.

Means is provided for reciprocating the troughlike member 15, made up of the grate members 48, side members 62, and the ash discharge extension, the hopper, and the air chamber 36 in such a manner that the fuel, indicated by the number 113 in the drawings, will be caused to move toward the discharge end of the stoker. The means for obtaining such a movement is driven from a motor 114 through a speed reduction device 115, which is driven from the motor by means of a belt 116 extending over a pulley 117 on a shaft 118 of the motor and over a pulley 119 mounted on the input side of the speed reduction device. A sprocket wheel 120 on the output end of the speed reduction device has a sprocket chain 121 operating over the same and over a sprocket wheel 122 which is mounted on a cam shaft 123. The blower 47 is directly driven by the motor shaft 118 and accordingly will supply air to the apparatus the entire time that the motor is operating, even if for some reason the flexible drive members comprising the belt 116 and the sprocket chain 121 should cease to function properly.

The cam shaft 123 has a broad cam member 124 keyed thereto which has a roller 153 mounted in a recess therein, forming a continuation of the face 126 of said cam, said cam face 126 gradually rising toward the roller 153.

The cam shaft 123 is mounted in bearings 154 which are mounted in a transversely extending plate 127 so as to depend therefrom. Suitable spacing members 128 are provided between the bearings and the plate. The plate 127 is secured to the under side of a plate 129 that overlaps and extends forwardly from the top wall 44 of the air chamber 36 and is fixed thereto. The plate 129 serves as a platform upon which the motor 114 and the speed reducing device 115 and the blower 47 are mounted in the manner shown in the drawings. A roller 125 is mounted on a shaft 130 which is journaled in two brackets 131 and 132 provided with bases 133 and 134 that are mounted on a plate 139.

Laterally extending brackets 135 are secured to the side walls 37 of the chamber 36, suitable spacing means being provided between said members 135 and said side walls, as will be evident from Figure 7, said brackets having openings therein through which the screw threaded ends 136 of two rodlike members 137 extend. Said rodlike members slidably pass through openings in a cross bar 138 provided on the rockable plate 139. Said cross bar 138 can be made in the form of a flange integral with the member 139 or can be secured thereto in any suitable manner. The screw threaded ends 136 of the rods 137 are fixed to the brackets 135 adjustably by means of the nuts 140 and 141 engaging opposite faces of the bracket 135. Slidably mounted on each rodlike member 137 are sleevelike members 142, 143, and 144, said sleevelike members having stop flanges 145, 146 and 147 thereon which may be made by welding washers thereto. Mounted between the flanges 146 and 147 are compression coil springs 148, and mounted between said flanges 146 and the flanges 145 are compression coil springs 149. The initial compression on the springs 148 and 149 can be adjusted by means of an adjusting nut 150 and a lock nut 151 on each member 137, a washer 152 being provided between the nut 150 and the flange 145.

Figure 8:
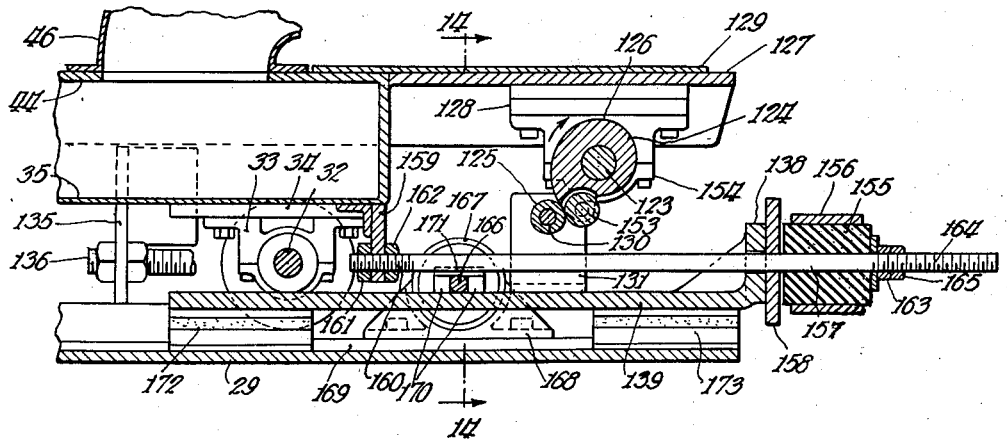
Figure 8 is a section taken on the line 8—8 of Figure 5.
Figure 9:
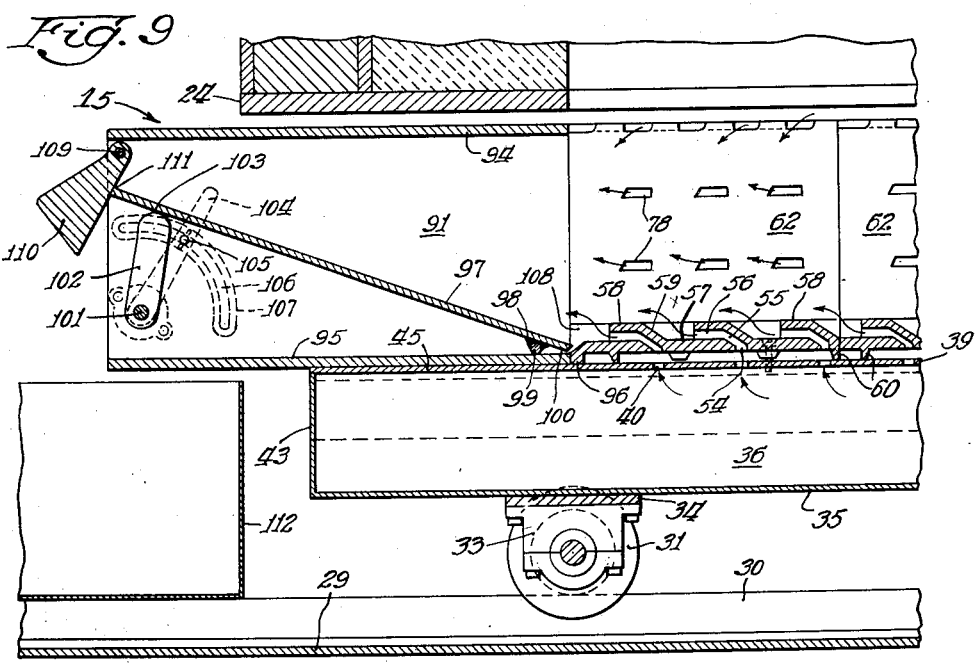
Figure 9 is a section taken on the line 9—9 of Figure 2 but on a larger scale than Figure 2.
Figure 10:
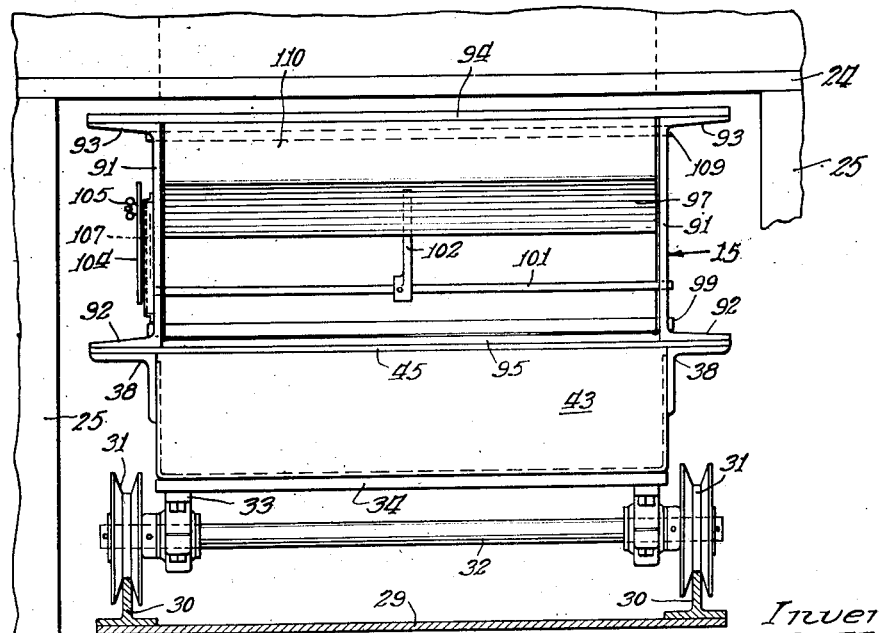
Figure 10 is a section taken on the line 10—10 of Figure 1 but on a larger scale than Figure 1.

When the roller 125 is engaged by the high point on the cam 124 at the roller 153, the roller 125 having ridden along the gradually rising face 126 of the cam, said cam rotating in the direction indicated by the arrow in Figure 8, the roller 125 being stationary and the cam being mounted on the movable carriage comprising the troughlike member and other parts mounted on the wheels 31, the troughlike member and the parts carried thereby will have been moved to the right as viewed in Figures 1, 2 and 7, thus moving the brackets 135 to the right and compressing the springs 148 and 149 between the cross bar 138 and the abutment provided by the flange 145. The sleevelike members 142, 143 and 144 fitting within the coils of the springs 148 and 149 loosely will prevent any bowing of the springs out of line, so that the axis of the coils of the springs will coincide with the axis of the rodlike members 137. After the roller 125 drops off the high point of the cam around the roller 153, the compression on the springs will be suddenly relieved, causing rapid movement of the troughlike member and all parts moving therewith to the left in Figures 1, 2 and 7. When the springs 148 and 149 are compressed a rubber bumper member 155, which is mounted on a rodlike member 157 slidably extending through openings in the member 138 and a reenforcing disclike member 158, will be spaced from the member 138 due to the fact that such rodlike member is fixed to a depending bracket 159 at the screw threaded end 160 thereof by means of two nuts 161 and 162. Accordingly when the troughlike member with which said bracket 159 moves, being secured to the bottom wall 35 of the air chamber 36, is projected rapidly toward the left, due to the dropping of the roller off the high point of the cam, the bumper member 155 will engage with the member 158 on the cross bar 138 and this will suddenly halt the movement of the troughlike member toward the left in Figures 1, 2 and 9. The initial compression of the member 155 can be adjusted by means of a nut 163 engaging the screw threaded end 164 of a rodlike member 157, a lock nut 165 being provided for holding the parts in adjusted position. The member 155 is compressed in a sleeve 156 to prevent circumferential expansion of the member 155 when it is compressed endwise.

The platelike member 139 is mounted for a slight rocking movement about the axis of a shaft 166. The shaft 166 has a pair of bearings 167 mounted thereon which are mounted in two angle members 168 fixed to the base member 29, said angle members being mounted on spacers 169 which rest upon the base member 29 (see Figure 8). This bearing consists of a metal ring in which there is a rubber ring 167b, that is compressed by two tapered blocks 167a, entering the rings from opposite sides. This provides a yielding mounting for shaft 166. The shaft 166 is mounted between a pair of blocks 170 projecting upwardly from the platelike member 139 and fixed thereto, said blocks being bridged by means of a platelike member 171 to complete the mounting of the shaft 166 to the plate 139.

The plate 139 is mounted on front and rear cushions 172 and 173 so as to provide a flexible mounting permitting a limited rocking motion of the plate 139 about the shaft 166. A pair of the cushion members 172 is provided at the rear end of the plate 139 and a pair of the cushion members 173 is provided at the forward end of the member 139. Said cushion members as will be obvious from Figures 5 and 14, each comprise a channel member 174 secured to the under side of the platelike member 139 and a pair of angle members 175 secured to the base plate 29. Between said channel 174 and the angles 175, pads of rubber or other compressible material 176 are provided, said channel members 174 and angle members 175 being molded in the bodies of rubber 176 so as to be fixed thereto.

Due to the yieldable mounting of the plate member 139, the compression of the springs 148 and 149 acting on the member 138 will have a tendency to force the forward end of the plate member 139 downwardly, compressing the members 173, this taking place gradually as the high point of the cam is approached by the roller 125. When the high point of the cam is passed, then the sudden engagement of the bumper member 155 with the member 158 on the transverse member 138 will exert a force on the plate 139 such as to tend to tilt the forward end thereof upwardly, compressing the cushion members 172.

As a result of the actuating mechanism and cushion means above described, the troughlike member 15 comprising the grate and the side members and the extensions thereon at the opposite ends thereof, will move at a gradual rate toward the right and will move suddenly toward the left and be stopped suddenly in the leftward movement thereof (as viewed in Figures 1 and 2 of the drawings) when the bumper member engages the member 158. The halting of the movement toward the left is cushioned by means of the member 155 and the cushion elements 172 which will cooperate to cushion the shock of the sudden stopping of the reciprocating parts of the stoker. The sudden stop causes the fuel, due to the inertia thereof, to continue to move to the left after the leftward movement of the trough has been halted. Furthermore, the shock will be cushioned from the base plate and thus will not be transmitted to the building on which the base plate is mounted because of the provision of the cushion members 172 and 173. Whenever the motor is started to operate the cam mechanism for reciprocating the trough-like member and the parts moving therewith, the blower 47 will operate discharging air under suitable pressure into the chamber 36, which will pass out through the passages 54, 55 and 56, in jets and be deflected by the inclined surfaces 59 so as to exert a lifting force on the fuel and a forward force to increase the movement of the fuel toward the left in Figures 1 and 2 because of the sudden stopping of the leftward movement of the troughlike member. I find, for example, that I can increase the rate of movement of the fuel by upwards of 50% by utilizing the air jets fed by a source of air, the static pressure of which is of the order of 0.7 lb. above the air pressure over the fuel bed.

While this gradual movement of the troughlike member 15 in one direction, and rapid movement and stopping thereof in the opposite direction is preferred for my improved stoker, satisfactory results in some instances can be obtained by merely reciprocating the troughlike member so as to agitate the fuel therein while directing the air jets thereto through the nozzles 56 so as to propel the fuel toward the discharge end of the stoker. The effect of the air jets in the forward and upward direction is enhanced during the forward movement of the member because the speed of the member is added to the speed of the jet through the nozzles while on reverse movement of the member the jets oppose the reversal of movement of the fuel. Thus a substantial forward movement of the fuel particles is obtained.

Instead of using a hopper feed such as above described, my improved stoker will operate successfully to burn fuel in case the hopper mechanism is not operating, by feeding the fuel through the fire door 177.

The air discharged through the nozzles formed by the passages 56 deflected by the inclined offset portions 59 discharges streams of air into the fuel bed, which dries the fuel in the covered portion of the troughlike member 15 that projects forwardly from the portion within the furnace and connects the hopper with the portion within the furnace. This drying of the fuel is a decided advantage in that the fuel is conditioned for combustion before it enters the combustion zone. Frequently much moisture is present in fuel that is used in a stoker of this character and the draining of the water therefrom is greatly enhanced by the construction shown. The peculiar shaking action actually causes the water to separate faster from the wet coal particles and to be forced out through the drain at a very rapid rate.

In Figures 15 and 16 I show another form of bumper member that is quite successful. In this form the member 158 has a tapered body 178 fastened thereto. This body may be cone shaped or of other tapered form. It is made of material of sufficient strength such as solid wood, a steel shell or of a plastic or fiber composition. A tapered shell 179 is threaded on the rod 157 and locked in place by a nut 180. To provide a yielding shock absorbing medium between the two surfaces I provide a high friction lining 181 between them. This lining is secured to one of the tapered members for example to the shell 179. I find brake lining to be a satisfactory lining. It can be mounted by rivets as shown. This construction tends to eliminate more of the recoil when the sudden stop occurs.

In Figures 17 and 18 I show a modification of the throat for the fuel between the hopper and the combustion part of the trough. According to this modification I place a wedge 182 on the under surface of the top plate 85 and extend this wedge down close to the grate elements 48 in the bottom of the throat. This wedge serves to limit the escape of fuel from the hopper. It may be varied greatly in size to block more or less of the hopper outlet. It may be made hollow as indicated to reduce its weight.

Having thus described my invention, what I claim and desire to secure by Letters Patent is:

1. In a furnace, a wall having an opening therein, a movable troughlike member comprising a fuel supporting grate mounted in said furnace, said troughlike member projecting through said opening, a hopper mounted on the projecting portion thereof in spaced relation to said furnace wall to move with said troughlike member, said projecting portion being closed at the top thereof, and means at the inner end of said projecting portion for blowing dust therefrom upwardly into the space above the fuel bed.

2. In a furnace, a bodily movable fuel supporting grate receiving fuel at one end thereof and discharging ashes from the other end thereof, means for reciprocating said grate toward and then away from the ash discharge end to agitate the fuel thereon, and stop means for abruptly stopping the advance of the grate toward the ash discharge end said grate having air passages leading upwardly from the under side of said grate and having portions parallel to the top surface of said grate and directed to discharge air on the top face of said grate toward the discharge end thereof.

3. In a furnace, a bodily movable fuel supporting grate receiving fuel at one end thereof and discharging ashes from the other end thereof, means for reciprocating said grate toward and then away from the ash discharge end to agitate the fuel thereon, stop means for abruptly stopping the advance of the grate toward the ash discharge end said grate having air passages leading upwardly from the under side of said grate and having portions parallel to the top surface of said grate and directed to discharge air on the top face of said grate toward the discharge end thereof, and means on said grate for deflecting the air discharged on the top face thereof upwardly at an oblique angle to said top face.

4. In a furnace, a bodily movable fuel supporting grate receiving fuel at one end thereof and discharging ashes from the other end thereof, means for reciprocating said grate toward and then away from the ash discharge end in a manner to move the fuel thereon toward the discharge end thereof, and stop means for abruptly stopping the advance of the grate toward the ash discharge end said grate having air passages leading upwardly from the under side of said grate and having portions parallel to the top surface of said grate and directed to discharge air on the top face of said grate in a direction to cooperate with said reciprocating means to move said fuel toward said discharge end.

5. In a furnace, a bodily movable fuel supporting grate receiving fuel at one end thereof and discharging ashes from the other end thereof, means for reciprocating said grate toward and then away from the ash discharge end in a manner to move the fuel thereon toward the discharge end thereof, and stop means for abruptly stopping the advance of the grate toward the ash discharge end said grate having air passages leading upwardly from the under side of said grate and having portions parallel to the top surface of said grate and directed to discharge air on the top face of said grate toward the discharge end thereof, and means on said grate for deflecting the air discharged on the top face thereof upwardly at an oblique angle to said top face.

6. In a furnace, a wall having an opening therein, a movable troughlike member adapted to receive a quantity of fuel and comprising a fuel supporting grate mounted in said furnace, said troughlike member projecting through said opening, a hopper mounted on the projecting portion thereof in spaced relation to said furnace wall to move with said troughlike member, said projecting portion being closed at the top thereof, and means for drying the fuel supplied to said troughlike member from said hopper, comprising air blast nozzles in said projecting portion communicating with the fuel in the projecting portion.

7. Means to advance fuel into a furnace comprising in combination a reciprocating fuel supporting trough with means to impart rapid repeated short reciprocatory movements thereto toward and away from the discharge end thereof, stop means for abruptly stopping the movement in the direction toward the discharge end, the fuel trough having its bottom composed of fuel supporting surfaces separated by air inlet nozzles all formed to direct jets of air up into the fuel bed and toward the discharge end of the trough, and means supplying air under pressure to said nozzles continuously during movement of the trough in both directions whereby to advance the fuel and lift it as it is being reciprocated in one direction and to retard return movement of the fuel upon reverse movement of the trough.

8. A stoker comprising a troughlike member forming a fuel support, said member having air jet nozzles in closely spaced relation in the bottom thereof, said nozzles being directed toward one end of the member, a carrier for said member, a hopper on said carrier, a fan on said carrier, means connecting said fan to said nozzles whereby to supply air under pressure thereto, and means to reciprocate said carrier.

9. A stoker comprising a troughlike member having a fuel inlet at one end and an ash discharge outlet at the other end, means mounting said member for reciprocatory movement, and means to cause said member to advance toward its discharge end at an increasing rate of speed, stop suddenly and return toward its inlet end at a relatively slow rate, said means comprising springs urging the member in the first named direction, a stop member limiting the advance of said member in the aforesaid direction, power means for moving said member in the opposite direction and releasing it, and a yielding bumper movable with the trough member to engage said stop member.

10. A stoker comprising a troughlike member having a fuel inlet at one end and an ash discharge outlet at the other end, means mounting said member for reciprocatory movement, and means to cause said member to advance toward its discharge end at an increasing rate of speed, stop suddenly and return toward its inlet end at a relatively slow rate, said means comprising springs urging the member in the first named direction, a stop member limiting the advance of said member in the aforesaid direction, power means for moving said member in the opposite direction and releasing it, and yielding mounting means for said stop member, comprising a base plate, a second plate secured on the base plate by yielding cushions and carrying the stop member, and a shaft pivoting the second plate on the first plate.

11. A stoker comprising a troughlike member having a fuel inlet at one end and an ash discharge outlet at the other end, means mounting said member for reciprocatory movement, and means to cause said member to advance toward its discharge end at an increasing rate of speed, stop suddenly and return toward its inlet end at a relatively slow rate, said means comprising springs urging the member in the first named direction, a stop member limiting the advance of said member in the aforesaid direction, power means for moving said member in the opposite direction and releasing it, and yielding mounting means for said stop member.

12. In a furnace, a wall having an opening therein, a movable troughlike member comprising a fuel supporting grate mounted for reciprocation in said furnace, said troughlike member projecting through said opening, a hopper on said member outside the furnace wall, spring means to advance said member into the furnace, power means to withdraw the member a limited distance against the force of said spring means, and cushion stop means for suddenly stopping said member in its advance by the springs, said cushion stop means comprising two telescoping tapered members and a yielding high friction lining between them.

13. In a furnace, a wall having an opening therein, a movable troughlike member comprising a fuel supporting grate mounted for reciprocation in said furnace, said troughlike member projecting through said opening, a hopper on said member outside the furnace wall, spring means to advance said member into the furnace, power means to withdraw the member a limited distance against the force of said spring means, and cushion stop means for suddenly stopping said member in its advance by the springs, said stop means comprising a resiliently mounted and pivoted stop bar.

14. A grate structure for furnaces adapted to advance particles of solid fuel of mixed sizes through a combustion zone, and to discharge the ash residue, comprising a trough structure embodying a bottom wall and side walls, power means to move said trough endwise to and fro in such manner as to impart a greater travel of fuel particles thereon toward the discharge end of the trough, air jet nozzles in the bottom wall of said trough directing air under pressure upwardly and toward the discharge end of said trough, means supplying said nozzles with air under pressure and air inlets in said side walls directed toward said discharge end and downwardly.

15. In a furnace, a wall having an opening therein, a movable troughlike member comprising a fuel supporting grate mounted for reciprocation in said furnace, said troughlike member projecting through said opening, a hopper on said member exteriorly of said wall, a fan carried on said member, and a forced air duct on said member leading from said fan.

16. In a furnace, a wall having an opening therein, a movable troughlike member comprising a fuel supporting grate mounted for reciprocation in said furnace, said troughlike member projecting through said opening, a hopper on said member exteriorly of said wall, a fan carried on said member, a motor on said member for reciprocating said member, and a forced air duct on said member leading from said fan.

17. A stoker comprising a troughlike member having a fuel inlet at one end, an ash discharge outlet at the other end and a fuel supporting grate therebetween, means mounting said member for reciprocatory movement, and power means connected in driving relationship with the troughlike member to advance said member toward its discharge end and then to return said member toward its inlet end, a stop member for abruptly stopping the advance of said member toward its discharge end before the member is moved in its return direction, a blower on the inlet side of the member, and means directing air from said blower through said grate in a direction toward the discharge end of said troughlike member.

18. A stoker comprising a troughlike member having a fuel inlet at one end, an ash discharge outlet at the other end, and a fuel supporting grate therebtween, a hopper mounted on the troughlike member for supplying fuel to said troughlike member, means mounting said member for reciprocatory movement, and power means connected in driving relationship with the troughlike member to advance said member and the hopper toward its discharge end and then to return said member and the hopper toward its inlet end, a stop member for abruptly stopping the advance of said member toward its discharge end before the member is moved in its return direction, a blower on the inlet side of the member, and means directing air from said blower through said grate in a direction toward the discharge end of said troughlike member.

19. A stoker comprising a troughlike member having a fuel inlet at one end, an ash discharge outlet at the other end and a fuel supporting grate therebetween, means mounting said member in reciprocatory movement, and power means connected in driving relationship with the troughlike member to advance said member toward its discharge end and then to return said member toward its inlet end, a stop member for abruptly stopping the advance of said member toward its discharge end before the member is moved in its return direction, a blower on the inlet side of the member, and means directing air from said blower and against the fuel supported on the grate, the direction of said air against the fuel being toward the discharge end of said troughlike member so as to exert a force tending to move the fuel in said direction.

GEORGE A. KOHOUT.

REFERENCES CITED

The following references are of record in the file of this patent:

UNITED STATES PATENTS

| Number | Name | Date |
|---|---|---|
| 527,593 | Coxe | Oct. 16, 1894 |
| 1,151,138 | Van Vleck | Aug. 24, 1915 |
| 1,481,366 | Herkenrath | Jan. 22, 1924 |
| 1,582,127 | Cope | Apr. 27, 1926 |
| 1,582,951 | Wedge | May 4, 1926 |
| 1,651,026 | Herkenrath | Nov. 29, 1927 |
| 1,802,960 | Simonds | Apr. 28, 1931 |
| 1,947,831 | Davidson | Feb. 20, 1934 |
| 2,033,570 | Cruikshank | Mar. 10, 1936 |
| 2,120,046 | Tretheway | June 7, 1938 |
| 2,170,277 | Richardson | Aug. 22, 1939 |
| 2,261,540 | Coder | Nov. 4, 1941 |
| 2,311,373 | Durning | Feb. 16, 1943 |
| 2,340,190 | Kohout | Jan. 25, 1944 |
| 2,375,743 | Lancaster | May 8, 1945 |

FOREIGN PATENTS

| Number | Country | Date |
|---|---|---|
| 226,725 | Great Britain | Apr. 23, 1924 |
| 357,916 | Great Britain | Oct. 1, 1931 |
| 638,961 | France | Feb. 28, 1928 |
| 697,459 | Germany | Oct. 15, 1940 |